Sept. 25, 1956
G. STAMPE
2,764,153
DUST FILTER
Filed April 11, 1955
2 Sheets-Sheet 1
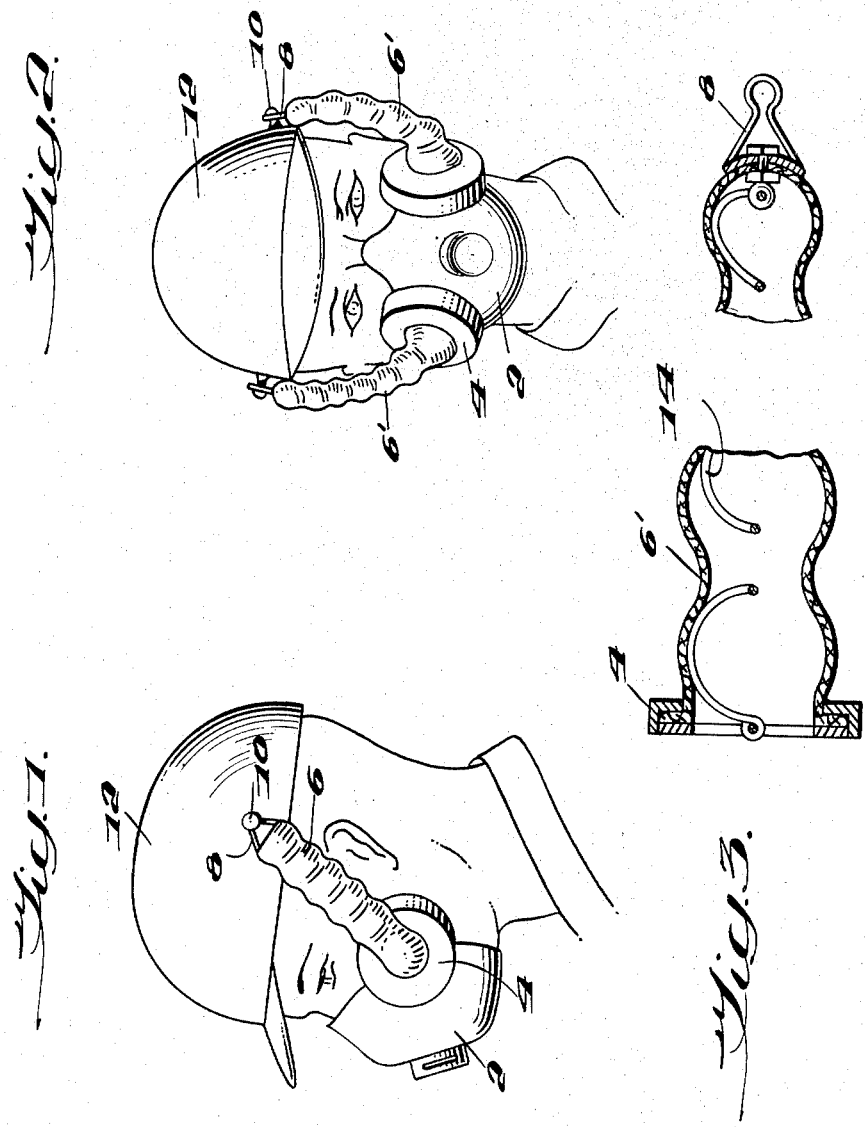
INVENTOR
Gerhard Stampe
BY Bailey, Stephens and Huettig
ATTORNEY Sept. 25, 1956  G. STAMPE  2,764,153
DUST FILTER
Filed April 11, 1955  2 Sheets-Sheet 2
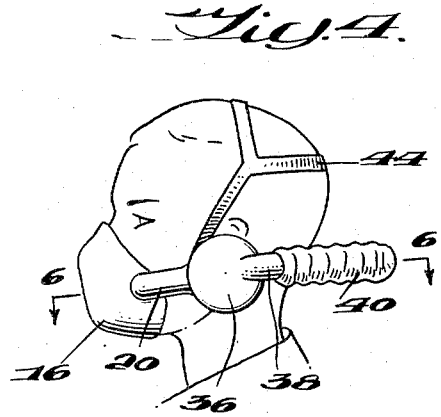
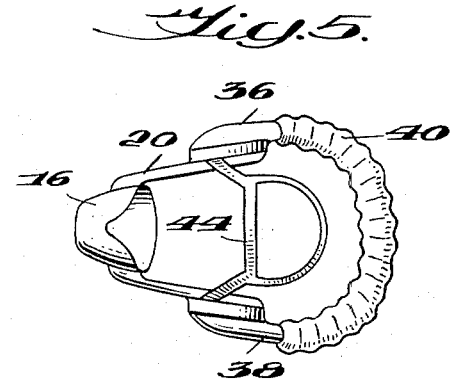
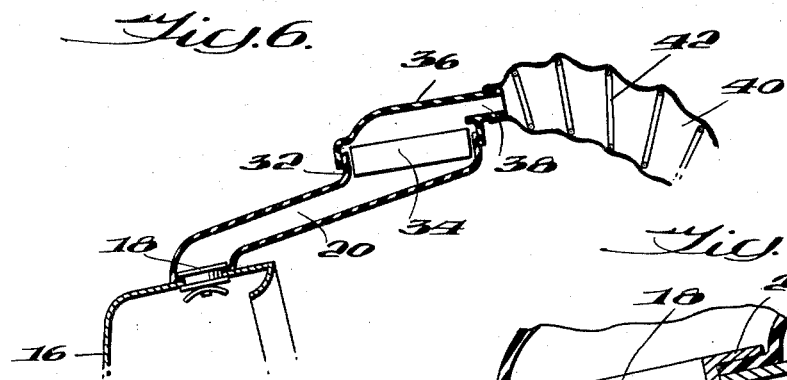
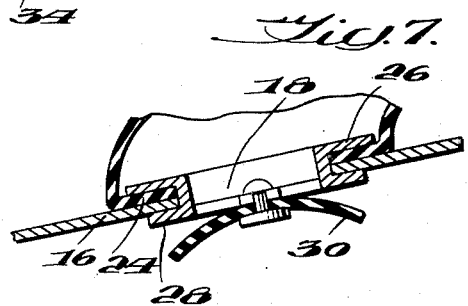
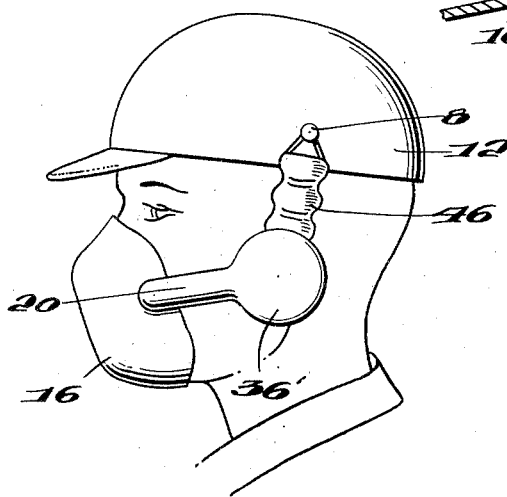
INVENTOR
Gerhard Stampe
BY Bailey, Stephens and Huettig
ATTORNEYS

United States Patent Office 2,764,153
Patented Sept. 25, 1956

2,764,153

DUST FILTER

Gerhard Stampe, Lubeck, Germany, assignor to Otto Heinrich Drager, Lubeck, Germany Application April 11, 1955, Serial No. 500,480

Claims priority, application Germany April 10, 1954

11 Claims. (Cl. 128—146)

This invention relates to respirators, and more particularly to dust filters. It presents certain improvements over the constructions disclosed in my prior application for Dust Filters, Serial No. 450,770, filed August 17, 1954.

One of the objects of the invention is to provide a respirator in which the coarse filter also serves as a securing means for holding the filter in position on the head of the wearer.

A further object of the invention is to provide a coarse dust filter of elongated shape and of a bellows-like nature, in which is embodied a spring, so that the filter is resiliently extensible in length and resiliently deformable crosswise of its length.

Another object of the invention is to provide a dust filter construction in which the fine dust filter is readily removable and replaceable.

Still a further object of the invention is to provide a simple structure for detachably connecting the coarse dust filter to the mask, the disconnection of the joint between the two preferably also permitting removal and replacement of the fine dust filter.

Further objects and advantages of the invention will appear more fully from the following description, especially when taken in conjunction with the accompanying drawings which form a part thereof.

In the drawings:

Fig. 1 shows in side elevation a respirator embodying my invention;

Fig. 2 is a front view of a slightly modified form;

Fig. 3 is a longitudinal cross-section through the coarse filter of Fig. 2;

Fig. 4 shows in side elevation another form of respirator;

Fig. 5 is a plan view thereof;

Fig. 6 is a cross-section on the line 6—6 of Fig. 4;

Fig. 7 is an enlargement of a part of Fig. 6; and

Fig. 8 shows in side elevation a further modification.

Half-mask 2 has secured to it, in the manner disclosed in my prior application above referred to, fine dust filters 4 which may be constructed as shown in such application. From these extend the coarse dust filters 6. These filters are of coarse cloth suitably impregnated if desired, and are of bellows-like form. Arranged within the coarse filters are coil springs (such as shown in Fig. 3, to be described below), which make the coarse filters elastically extensible.

These elastic filters serve as means to secure the mask in position on the face, since they have at their ends loops 8 which can engage buttons 10 on a cap 12.

In the form of Figs. 2 and 3, coarse filters 6 are similar to those of Fig. 1 except that they decrease in cross section away from the fine dust filter. Fig. 3 shows a coil spring 14 arranged inside the coarse dust filter and secured therein at each end.

In the form of Figs. 4 to 7, half-mask 16 has in each side wall an opening 18. Over this opening is secured one end of a conduit member 20, which is formed preferably of a resilient material such as rubber. Conduit 20 has a downwardly bent end portion with an internally directed flange 24. A fitting arranged in hole 18 has a flange 26 overlying flange 24 and clamping it against the wall of mask 16, and a second flange 28 engaging the inside of this wall. Mounted on a spider within the fitting is the inlet valve 30, such as a disc of rubber, here shown in partly open position.

Conduit 20 terminates in an enlarged, outwardly opening, annular portion 32, within this opening fits rather tightly a container 34 enclosing a fine dust filter of suitable construction. Over the outside of member 32 fits a cap 36, also preferably of resilient material such as rubber. This cap has a lateral tubular extension 38, upon which is secured one end of the coarse dust filter 40.

Filter 40 contains a coil spring 42 which renders it rigid enough to stand out as shown and requires no separate support. Straps 44 hold the mask on the head of the wearer.

In the form shown in Fig. 8, the structure is as shown in Figs. 4 to 7 except that each cap 36' has an upward extension to which is connected a coarse dust filter 46 shaped like those of Fig. 2 and containing a coil spring and having at its upper end a loop 8 adapted, as in Figs. 1 to 3, to engage a button on cap 12 to hold the mask on the face of the wearer.

The connection between cap 36' and annular member 32 may be a frictional one, or may be enhanced by ribs on one of the bodies, by a bayonet joint or in other suitable ways.

The present invention has numerous advantages. The construction is simple and inexpensive, and permits easy replacement of the fine filter. The mask can be readily separated from the coarse filter, and reassembly is simple and quick. The fine filter can be located at some distance from the mask, at or slightly beyond the head of the wearer, so that there is little danger of striking the filters against obstructions as the wearer moves about.

While I have described herein some embodiments of my invention, I wish it to be understood that I do not intend to limit myself thereby except within the scope of the claims hereto or hereinafter appended.

I claim:

1. A respirator having a mask, a fine filter, means mounting said fine filter in communication with the interior of the mask in position to lie on the side of the head of the wearer substantially at mouth level, and a coarse filter communicating with the fine filter, said coarse filter comprising a resiliently extensible tube of porous material of bellows-like nature.

2. A respirator having a mask, a fine filter, means mounting said fine filter in communication with the interior of the mask in position to lie on the side of the head of the wearer substantially at mouth level, and a coarse filter communicating with the fine filter, said coarse filter comprising a tube of porous material of bellows-like nature, and a coil spring associated with said tube and secured to the ends thereof.

3. A respirator comprising a mask, two fine filters, means mounting said fine filters in communication with the interior of the mask in position to lie on the sides of the head of the wearer substantially at mouth level, and coarse filters one communicating with each of the fine filters, each coarse filter comprising a resiliently extensible tube of porous material of bellows-like nature, and having at the end remote from the fine filter means for attachment to a headgear.

4. A respirator comprising a mask, two fine filters, means mounting said fine filters in communication with the interior of the mask in position to lie on the sides of the head of the wearer substantially at mouth level, and coarse filters one communicating with each of the fine filters, each coarse filter comprising a tube of porous material of bellows-like nature, and a coil spring associated with said tube and secured to the ends thereof, and having at the end remote from the fine filter means for attachment to a headgear.

5. A respirator comprising a mask, two fine filters, means mounting said fine filters in communication with the interior of the mask in position to lie on the sides of the head of the wearer substantially at mouth level, and a coarse filter communicating with both the fine filters and extending therefrom behind the head of the wearer, said coarse filter comprising a resiliently extensible tube of porous material of bellows-like nature.

6. A respirator comprising a mask, two fine filters, means mounting said fine filters in communication with the interior of the mask in position to lie on the sides of the head of the wearer substantially at mouth level, and a coarse filter communicating with both the fine filters and extending therefrom behind the head of the wearer, said coarse filter comprising a tube of porous material of bellows-like nature, and a coil spring associated with said tube and secured to the ends thereof.

7. A respirator having a mask, conduits connected with said mask and extending rearwardly therefrom along the cheeks of the wearer, flat casings connected with said conduits and arranged to lie against the side of the head of the wearer, fine dust filters filling said casings, cups adapted to fit with and close the outer openings of said casings and removable therefrom, said cups having outlets therefrom, and coarse filter means connected with said outlets.

8. In a respirator as claimed in claim 7, said coarse filter means comprising at least one resiliently extensible tube of porous material of bellows-like nature.

9. In a respirator as claimed in claim 7, said coarse filter means comprising at least one tube of porous material of bellows-like nature, and a coil spring associated with said tube and secured to the ends thereof.

10. A respirator having a mask, conduits connected with said mask and extending rearwardly therefrom along the cheeks of the wearer, flat casings connected with said conduits and arranged to lie against the side of the head of the wearer, fine dust filters filling said casings, cups adapted to fit with and close the outer openings of said casings and removable therefrom, said cups having outlets therefrom, and coarse filters one connected with each of said outlets, each coarse filter comprising a resiliently extensible tube of porous material of bellows-like nature, and having at the end remote from the fine filter means for attachment to a headgear.

11. A respirator having a mask, conduits connected with said mask and extending rearwardly therefrom along the cheeks of the wearer, flat casings connected with said conduits and arranged to lie against the side of the head of the wearer, fine dust filters filling said casings, cups adapted to fit with and close the outer openings of said casings and removable therefrom, said cups having outlets therefrom, and coarse filters one connected with each of said outlets, each coarse filter comprising a tube of porous material of bellows-like nature, and a coil spring associated with said tube and secured to the ends thereof, and having at the end remote from the fine filter means for attachment to a headgear.

References Cited in the file of this patent

UNITED STATES PATENTS

| 1,491,674 | Coletti | Apr. 22, 1924 |
| 2,130,555 | Malcom | Sept. 20, 1938 |

FOREIGN PATENTS

| 31,977 | France | Aug. 27, 1927 |
| 768,860 | France | Aug. 14, 1934 |
| 832,869 | France | Oct. 4, 1933 |